United States Patent [19]
Petit

[11] Patent Number: 5,754,611
[45] Date of Patent: May 19, 1998

[54] METHOD AND DEVICE FOR MEASURING AT LEAST ONE CHARACTERISTIC LENGTH ON A FUEL ROD ARRANGED AT THE PERIPHERY OF A NUCLEAR FUEL ASSEMBLY

[75] Inventor: Christophe Petit, Lyons, France

[73] Assignees: Framatome, Courbevoie; Cogema, Villacoublay, both of France

[21] Appl. No.: 722,764

[22] Filed: Sep. 27, 1996

[30] Foreign Application Priority Data

Sep. 27, 1995 [FR] France ................... 95 11333

[51] Int. Cl.$^6$ ........................... G21C 17/06
[52] U.S. Cl. ........................... 376/258
[58] Field of Search ................. 376/258, 245; 33/502

[56] References Cited

U.S. PATENT DOCUMENTS

| | | | |
|---|---|---|---|
| 3,967,382 | 7/1976 | Johnson et al. | 376/245 |
| 4,195,411 | 4/1980 | Gerkey | 376/258 |
| 4,728,483 | 3/1988 | Ahmed et al. | 376/258 |
| 4,741,878 | 5/1988 | Gebelin et al. | 376/245 |

FOREIGN PATENT DOCUMENTS 0 059 301   9/1982   European Pat. Off. .
2 601 180   1/1988   France .

OTHER PUBLICATIONS

Patent Abstracts of Japan, vol. 12, No. 226, Jun. 28, 1988, JP63019502.
Patent Abstracts of Japan, vol. 12, No. 226, Jun. 28, 1988, JP63019504.

*Primary Examiner*—Daniel D. Wasil
*Attorney, Agent, or Firm*—Pollock, Vande, Sande & Priddy

[57] ABSTRACT

An eddy-current probe (10) is moved in the axial direction of the clad of the rod (1), a first position of the probe (10) is determined in the axial direction, for which a signal from the probe is representative of the presence of the internal surface of the bottom end plug of the rod (1) and at least one second position for which the signal from the probe is representative of the presence of the end part of the spring of the fuel rod (1) or of the internal surface of the top end plug of the fuel rod (1). The total length and/or the length of the fissile stack are calculated from the first position and from the second position of the probe (10). The measurements may be performed inside the spent fuel storage pond of a reactor.

6 Claims, 7 Drawing Sheets

METHOD AND DEVICE FOR MEASURING AT LEAST ONE CHARACTERISTIC LENGTH ON A FUEL ROD ARRANGED AT THE PERIPHERY OF A NUCLEAR FUEL ASSEMBLY

FIELD OF THE INVENTION

The invention relates to a method and to a device for measuring a characteristic length on a rod of a nuclear fuel assembly.

BACKGROUND OF THE INVENTION

Nuclear fuel assemblies for water-cooled reactors, and in particular for nuclear reactors cooled by pressurized water, include a framework in which the rods are held in place in the form of a bundle in which the rods are all mutually parallel.

Each of the rods in the bundle of the nuclear fuel assembly includes a tubular cladding whose diameter is approximately, for example, one centimeter and whose length may be about four meters. The cladding is made of a low neutron-absorbent material such as a zirconium alloy. The nuclear fuel material, which may consist of uranium oxide enriched with fissile uranium, is arranged inside the cladding in the form of a stack of sintered pellets of fuel material which are stacked on top of each other in the axial direction of the cladding. The cladding of the rod is closed at a first end by an end plug engaged in the end part of the cladding of the rod and welded to the cladding. The pellet stack of fuel material arranged inside the cladding rests with one of its ends on a substantially plane surface of the end plug internal to the cladding. This first end plug of the fuel rod, on which the pellet stack of fuel material rests, constitutes the bottom end plug of the rod when the rod is arranged inside a fuel assembly in the service position in the core of a nuclear reactor or in the storage position in a pond.

A second end plug, called the top end plug, is engaged and welded to the second end of the cladding of the rod, this second end plug also including a surface directed towards the inside of the cladding. In order to allow a degree of expansion and a degree of swelling of the pellets of fuel material under the effect of the heating and the nuclear reactions inside the core of the nuclear reactor, the pellet stack of fuel material has a length less than the length of the internal space in the cladding of the rod between the internal surface of the bottom end plug and the internal surface of the top end plug. The pellet stack of fuel material is held in place inside the cladding by a helical spring inserted between the internal surface of the top end plug and the top end of the pellet stack opposite that end of the stack resting on the bottom end plug. When the nuclear reactor is in service, the fuel rods are subjected to a neutron flux which produces energy in the fuel material of the rods by nuclear reactions. The neutrons produced by the nuclear reactions in the pellets of fuel material constitute the neutron flux inside the core of the nuclear reactor.

Because of the nuclear reactions and the heating in the core of the reactor, the pellets of fuel material undergo expansions and swelling which may lead to deformation of the cladding of the rod. Furthermore, the thermal and mechanical stresses to which the fuel rods of the nuclear fuel assemblies in the core of the nuclear reactor are subjected may lead to damage which is added to the normal depletion of the fuel by burnup of the fissile material, so that at least some of the fuel rods of the assemblies become unsuitable for use in the fuel assemblies of the core after a certain residence time in the core of the operating reactor.

Periodically, the core of the nuclear reactor is refuelled, by replacing with new assemblies some (generally a third) of the core assemblies and repositioning the other core assemblies into new positions for a new period of operation of the nuclear reactor. To this end, after the nuclear reactor has been shut down, the fuel assemblies are removed from the core and placed in a fuel storage pond.

It is necessary to carry out various checks on the fuel rods before repositioning them in the core, these checks relating both to the framework supporting the rods of the assemblies and to the rods themselves.

The framework for the nuclear fuel assemblies includes, in particular, spacer grids distributed along the height of the fuel assemblies at regularly spaced-apart distances, which include a lattice of generally square-mesh cells in each of which is placed a fuel rod which is held inside the cell by springs and by bearing dimples.

The cross-section of the fuel assemblies, generally of square shape, includes rows of rods arranged in two directions at 90°. Only the four peripheral rows of rods are easily accessible from outside the fuel assembly and may be subjected to examination, such as visual examination or examination using non-destructive test methods. These checks remain purely qualitative and do not make it possible to obtain measurements relating to the deformation of the rods and to the state of the fuel material and of the spring inside the claddings, after a certain period of operation of the nuclear reactor.

The fact that it is not possible to obtain accurate numerical data limits the effectiveness of the fuel test programs in a nuclear reactor.

It has been proposed to carry out checks on the rods of the fuel assemblies in checking stations inside the fuel storage pond, but in order to carry out these checks it is necessary to dismantle the fuel assemblies and extract the rods in order to examine the irradiated rods under water.

It may be highly advantageous, with regard to knowing the behavior of the fuel rods in the core of a nuclear reactor, to measure certain characteristic lengths of a fuel rod after a residence time in the nuclear reactor. In particular, it may be extremely advantageous to be able to measure accurately the length of the pellet stack of fissile fuel material, or fissile stack, after a certain residence time in the core of the reactor during operation, or else the total length of the rod.

To date, there has been no known technique for precisely measuring the characteristic lengths on an irradiated fuel rod, in a fuel assembly arranged under water inside a pond.

SUMMARY OF THE INVENTION

The object of the invention is to propose a method for measuring at least one characteristic length on a fuel rod arranged at the periphery of a nuclear fuel assembly, the fuel rod including a tubular cladding, a stack of pellets of nuclear fuel material which are stacked in the axial direction of the cladding, a first closure end plug or bottom end plug, at a first end of the cladding, in contact with a first end of the stack of pellets of fuel material by means of an internal surface, a second closure end plug, for closing the second end of the cladding, or top end plug, and a helical spring inserted between an internal surface of the second end plug and a second end of the stack of pellets of fuel material, inside the cladding, this method making it possible to determine very accurately a characteristic length such as the length of the fissile column of the rod or the total length of the rod, without dismantling the fuel assembly and without extracting the rods.

To this end:

an eddy-current probe is moved in the axial direction of the cladding of the rod;

a first position of the eddy-current probe, with respect to a marker, in the axial direction, is determined, in which position a signal from the probe is representative of the presence of the internal surface of the first end plug level with the probe and at least one second position in which the signal from the probe is representative of the presence, level with the probe, of one of the following elements: the end part of the spring, in contact with the second end of the stack of pellets, and the internal surface of the second end plug; and the characteristic length is calculated from the first position and from the second position of the probe, these positions being defined with respect to the marker.

The invention also relates to a device making it possible to use the measurement method according to the invention inside a spent fuel pond of a nuclear reactor.

BRIEF DESCRIPTION OF THE DRAWINGS

In order that the invention may be more clearly understood, a description will now be given, by way of example, with reference to the drawing figures appended hereto, of one embodiment of the method according to the invention which makes it possible to determine the length of the fissile stack and the total length of any peripheral rod of a fuel assembly inside the fuel pond of a pressurized-water nuclear reactor.

DESCRIPTION OF PREFERRED EMBODIMENT

Figure 1:
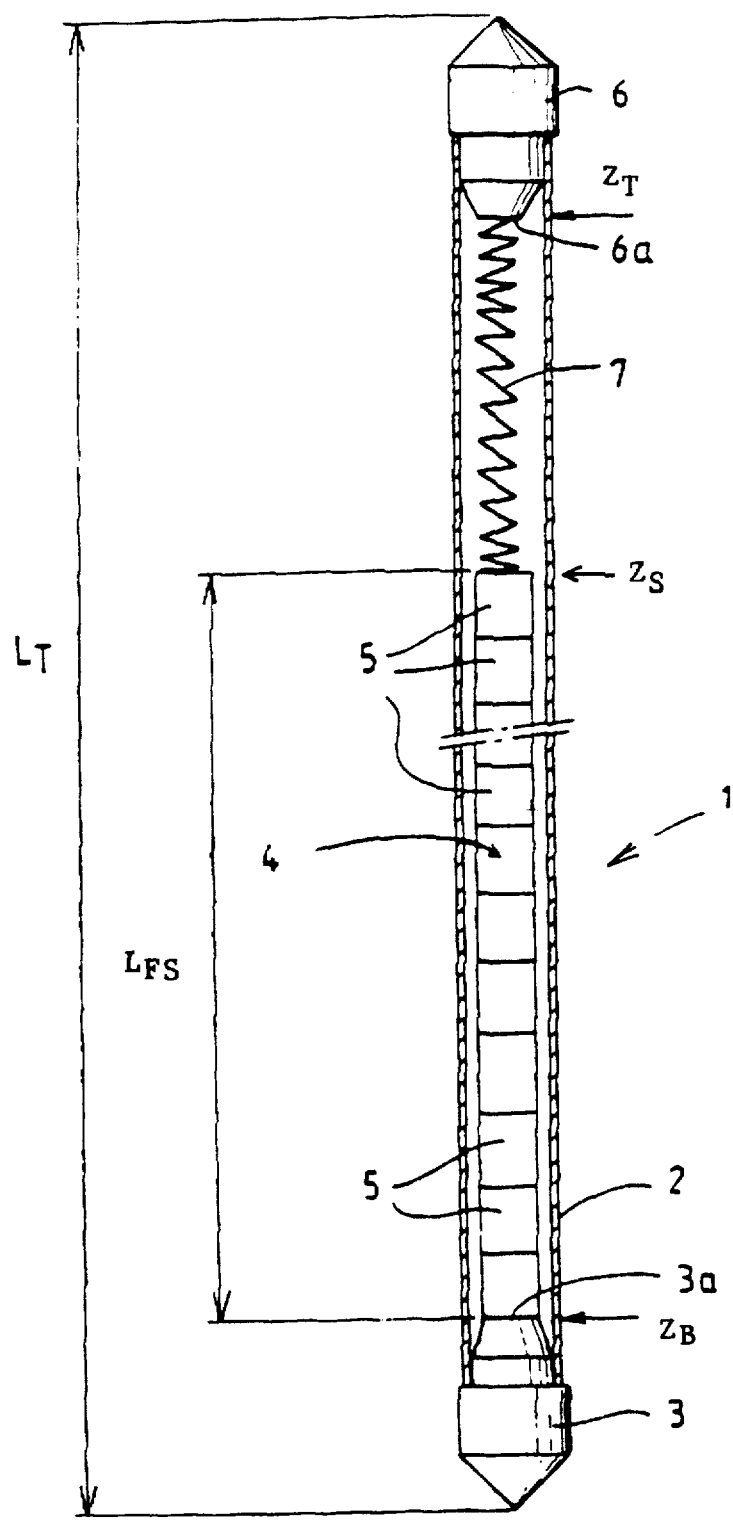
FIG. 1 is a view in section through a vertical plane of a rod of a fuel assembly of a pressurized-water nuclear reactor.

FIG. 1 shows a fuel rod 1 of a nuclear fuel assembly of a pressurized-water nuclear reactor. The fuel rod 1 includes a tubular cladding 2 made of a zirconium alloy such as Zircaloy 4, having a diameter of about one centimeter and a length of about four meters. For ease of representation in FIG. 1, the proportions of the rod have been greatly changed, the ratio of the diameter to the length of the rod having been greatly increased.

A first end plug 3, or bottom end plug, is engaged in a first end part of the cladding 2 which is closed by the end plug 3. The end plug 3 includes a cylindro-frustoconical part internal to the clad, the maximum diameter (diameter of the cylindrical part) of which is approximately equal to the inside diameter of the cladding so that the end plug is engaged virtually without any clearance in the bottom end part of the cladding. That part of the end plug 3 arranged inside the cladding 2 terminates in a plane surface 3a forming the small base of the frustoconical end of the internal part of the end plug 3. The cladding 2 contains a stack 4 of nuclear fuel pellets 5 which are stacked on top of one another in the axial direction of the cladding 2. For the sake of simplicity, the stack 4 has been shown as consisting of a relatively small number of pellets of fuel material. In reality, the cladding contains a very large number of pellets 5 stacked on top of one another. The pellets 5, obtained by sintering, may be made, for example, of a fissile fuel material such as uranium oxide $UO_2$ enriched with uranium 235. A first end of the stack of fuel material or fissile stack 4 rests on the internal surface 3a of the bottom end plug 3.

Inserted into the second end part of the cladding 2 of the rod, opposite the first end closed by the end plug 3, is a top end plug 6 which has a shape substantially identical to the bottom end plug 3 and which includes a cylindro-frustoconical part which is engaged inside the cladding 2 and terminates in a plane internal surface 6a substantially perpendicular to the axis of the cladding 2.

The total length in the axial direction of the stack 4 of pellets 5 of fissile combustible material is less than the length in the axial direction of the cladding between the internal surface 3a of the bottom end plug 3 and the internal surface 6a of the top end plug 6.

A helical spring 7 is inserted between the internal end 6a of the top end plug 6 and the top end of the fissile stack 4 opposite the end of the stack resting on the internal surface 3a of the bottom end plug 3. The spring 7, which is compressed between the end 6a of the end plug 6 and the top end of the fissile stack 4, holds the fuel pellets in place inside the cladding 2 of the rod 1.

After fitting the end plug 3, the fissile stack 4 is produced by stacking the pellets of fissile fuel material, the base of the stack resting on the internal surface 3a of the end plug 3. Next, the helical spring 7 and the top end plug 6 are fitted and the end plugs are welded to the cladding. The internal volume of the cladding 2 is evacuated and filled with an inert gas via the top end plug 6 which is subsequently closed in a sealed manner.

The fissile fuel pellets 5 have a diameter less than the inside diameter of the cladding so as to allow radial expansion of the pellets 5 during the irradiation-induced swelling of the pellets in the nuclear reactor during operation.

The axial expansion of the fissile stack 4 is compensated for by the helical spring 7.

After a certain period of use of a fuel assembly in the core of a nuclear reactor, the rods, which are engaged in the framework of the assembly, may have deteriorated somewhat, this being manifested by a deformation of the cladding 2 and by a modification in the shape and length of the fissile stack 4.

In order best to determine the behavior of the fuel rods in the reactor during operation, it may be necessary to perform accurate measurements of characteristic lengths of the rod, and in particular measurements of the total length of the rod (length $L_T$ in FIG. 1) or measurements of the length of the fissile stack 4 ($L_{FS}$ in FIG. 1).

It may be extremely advantageous to perform these measurements in the fuel cooling pond, without dismantling the fuel assemblies.

The method and the device according to the invention make it possible to perform such measurements in the cooling pond on the peripheral rods of the fuel assemblies removed from the core and stored in the spent fuel pond.

Figure 2:
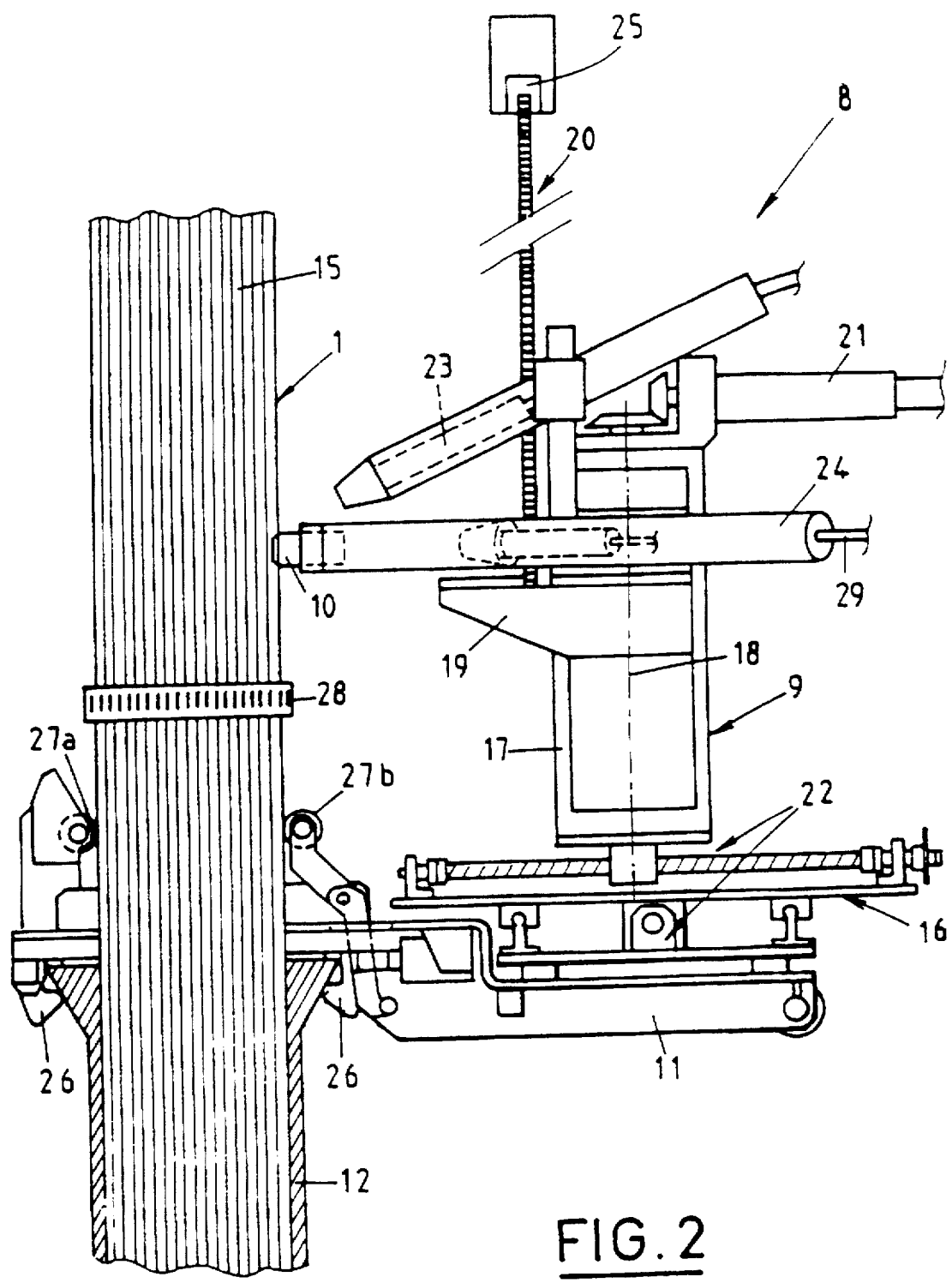
FIG. 2 is an elevation of an eddy-current device making it possible to use the method according to the invention.
Figure 2A:
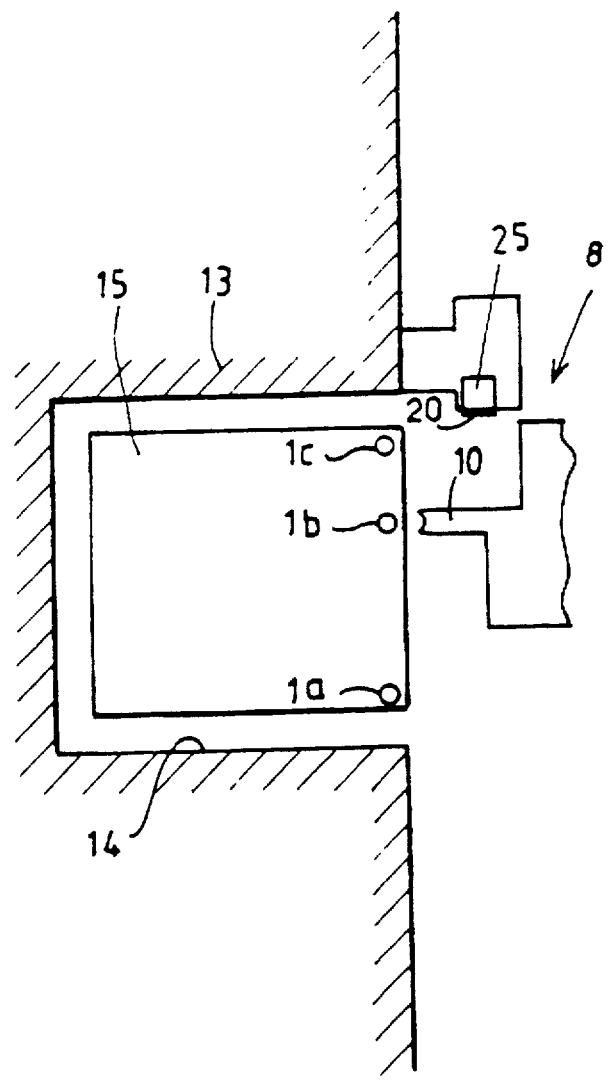
FIG. 2A is a schematic plan view of FIG. 2.

In order to perform the measurements of characteristic lengths on the peripheral rods of a fuel assembly, using the method according to the invention, a device such as that shown in FIGS. 2 and 2A may be employed.

The measurement device 8 includes an eddy-current probe 10 carried by a handling assembly 9 which will be described below, itself resting on a carrier 11 which may be fastened to the compartment 12 of an elevator for the spent fuel pond of the nuclear reactor.

As may be seen in FIGS. 2 and 2A, which show the measurement device 8 in the service position inside the spent fuel storage pond of a nuclear reactor, the wall 13 of the pond includes, inside a housing 14 set back inside the wall 13 of the pond, an elevator 12 consisting of a compartment which can accommodate a fuel assembly 15 and is associated with means for moving it in the vertical direction inside the vertical housing 14 in the wall of the pond in order to lower a fuel assembly 15 into the bottom of the pond. The fuel assemblies may be handled by the handling crane of the spent fuel pond in order to be laid in fixed compartments resting on the bottom of the spent fuel pond.

The measurement device 8 according to the invention is used in conjunction with a spent fuel pond elevator, the carrier 11 including means enabling it to be clamped to the upper part of the compartment 12 of the spent fuel pond elevator.

The carrier 11 includes a horizontal plate on which rests a table 16 for movement in two directions at 90° in the horizontal plane. The table 16 or XY table supports a vertical guide column 17 on which is mounted, for vertical movement along the axis 18, a carriage 19 for moving the probe 10 vertically.

The device which has just been described makes it possible to place the probe 10 opposite any rod lying at the periphery of the assembly 15, such as the rods 1a, 1b or 1c shown in FIG. 2A, by moving the XY table 16 in its first horizontal movement direction X.

The second movement in the horizontal direction (movement in the direction Y) makes it possible to move the eddy-current probe 10 perpendicularly to one face of the fuel assembly 15 between a position in which the probe 10 comes into contact with a fuel rod 1 of the assembly 15, as shown in FIG. 2, and a set-back position in which the probe 10 is not in contact with a rod of the assembly, as shown in FIG. 2A.

Motor means 22 controlled remotely from the edge of the spent fuel pond make it possible to move the measurement device 8, including the probe 10, in the X and Y directions; using a motor means 21, the probe 10 may be moved in the vertical direction or moved in the Z direction very precisely and at a very slow speed.

The probe 10 may also be moved vertically at high speed, the probe 10 being in its set-back position away from the peripheral rods of the fuel assembly 5, by virtue of the elevator 12 to which is clamped the carrier 11, on which the measurement device 8 with its movement means is mounted. Moving the entire measurement device 8 at high speed, using the elevator, makes it possible to place the probe 10 approximately opposite a measurement zone of a fuel rod of the assembly 15, such as the bottom end plug, the top end plug or the bottom part of the spring holding the fissile stack in place. When the probe 10 has been positioned approximately opposite the measurement zone, the elevator is stopped and the position of the probe 10 in the vertical direction is finely adjusted after it has been brought into contact with the rod 1 on which the measurement is to be performed, by moving the carriage 19 at very low speed.

During movements of the probe 10 in the vertical direction, whether these movements are carried out at high speed or at low speed, the position of the probe 10 in the direction Z is determined very accurately by using a marker 20 placed vertically along the wall of the fuel pond in an arrangement adjacent to the vertical housing 14 of the elevator.

The marker 20 consists of a flexible rule housed in a winder box arranged at the upper level of the pond, one end of which is fixed to the carriage 19 for moving the eddy-current probe 10 in the direction Z, including gradations which may be read and counted by a coding device 25. The coding device 25, arranged at the upper level of the pond, provides an output signal having square pulses, each of the pulses of the coder signal corresponding to a vertical distance of 0.1 mm. It is therefore possible to know the position of the probe with an accuracy of 0.1 mm.

Two video cameras 23 and 24 are designed to provide, at the upper level of the pond, on a screen, a picture of the end part of the probe 10 in order to verify that it has been put into place in the service on one of the peripheral tubes 1 of the assembly 15. The camera 23 provides a picture of the eddy-current probe 10 from above and the camera 24 provides a picture of the end of the probe 10 in a side view.

The carrier 11 of the measurement device 8 with its means for movement in the directions X, Y and Z includes a support belt having a square internal opening allowing passage of a fuel assembly as well as catches 26 for fixing the carrier 11 to the top part of the compartment 12 of the elevator, the catches 26 being associated with operating devices which may be actuated from the upper part of the spent fuel pond. Two guide rollers 27a and 27b are mounted on the top surface of the belt of the carrier 11 by means of pivoting supports so as to guide the movements of the carrier 11 with respect to the substantially plane external faces of the square-section assembly 15. The supports for the guide rollers 27a and 27b are pivotally mounted so as to allow the rollers to pass over the grids 28 of the assembly 15, in which grids the rods of the assembly are engaged, the rods thus being held in a uniform lattice.

The eddy-current probe 10 is mounted on a support fixed to the vertically moving carriage 19 and connected by means of a measurement cable 29 to a device, arranged at the upper level of the pond, for supplying electric current and for making use of the measurements. The cameras 23 and 24, as well as the movement devices 21 and 22, are also connected to supply and control means arranged at the upper level of the pond. It is therefore possible, remotely, to supply the probe, select the measurement signals, visualize the end part of the probe and the rods during examination, and control the movements of the probe in the X, Y and Z directions.

The rapid movements of the probe in the direction Z are controlled by the means for controlling the fuel pond elevator.

Figure 3:
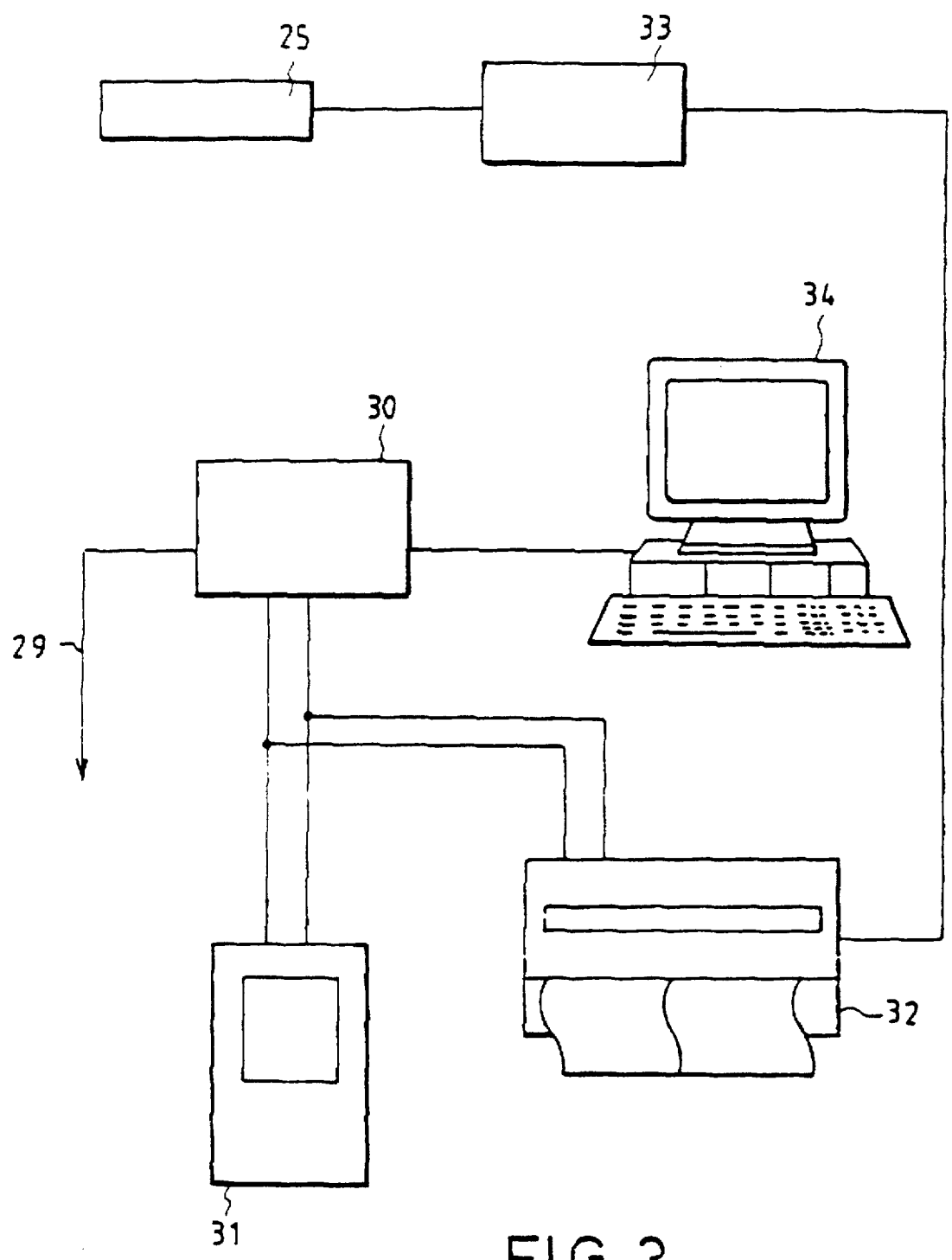
FIG. 3 is a schematic view of the length measurement system associated with the device shown in FIG. 2.

FIG. 3 schematically shows the measurement system which is associated with the measurement device shown in FIG. 2 and is arranged at the upper level of the pond. The measurement system includes a unit 30 called the eddy-current apparatus which combines the means for supplying the eddy-current probe and for collecting the measurement signals via the cable 29 as well as a unit 31 for visualizing the signals from the eddy-current probe and a graphics recorder 32 for recording these signals.

The eddy-current apparatus 30 has two output channels, called the X channel and Y channel, connected in parallel to the visualization unit 31 and to the recorder 32.

In addition, the measurement system includes a display device 33 connected to the height coder 25 of the measurement device, making it possible to display to within 0.1 mm the height of the eddy-current probe 10 inside the spent fuel pond. A microcomputer 34 makes it possible to manage the entire measurement program and to record the results of the measurements on the various peripheral rods of the fuel assemblies on which the measurements of characteristic length are carried out.

The control and measurement station located at the upper level of the pond also includes visual display screens which allow the operator responsible for the measurements to be provided with pictures of the end of the probe coming from the video cameras 23 and 24.

Figure 4:
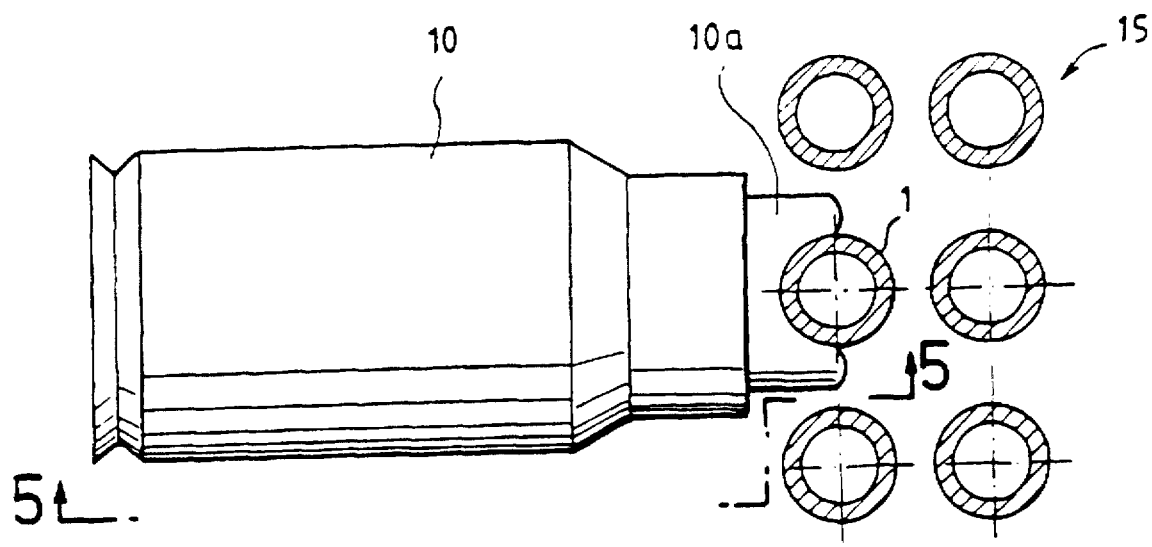
FIG. 4 is a plan view in the direction of arrow 4 in FIG. 5 of the eddy-current probe of the measurement device shown in FIG. 3, in contact with a peripheral fuel rod of a fuel assembly.
Figure 5:
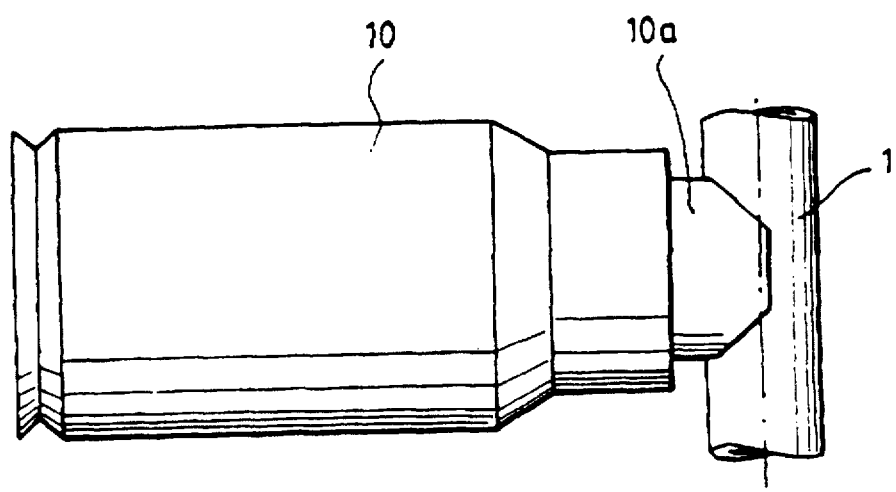
FIG. 5 is a side view along the direction 5—5 in FIG. 4.

FIGS. 4 and 5 show the eddy-current probe 10 whose end part 10a forming the measurement head is placed in contact with a fuel rod 1 of the bundle of the nuclear fuel assembly 15 on which length measurements are carried out.

The measurement head 10a of the eddy-current probe 10 has a recessed shape with a substantially cylindrical contact surface allowing perfect contact and perfect coupling between the measurement head and the surface of the cladding of fuel rod 1.

The measurement head 102 may be made of zirconium oxide $ZrO_2$ or zirconia.

Figure 6:
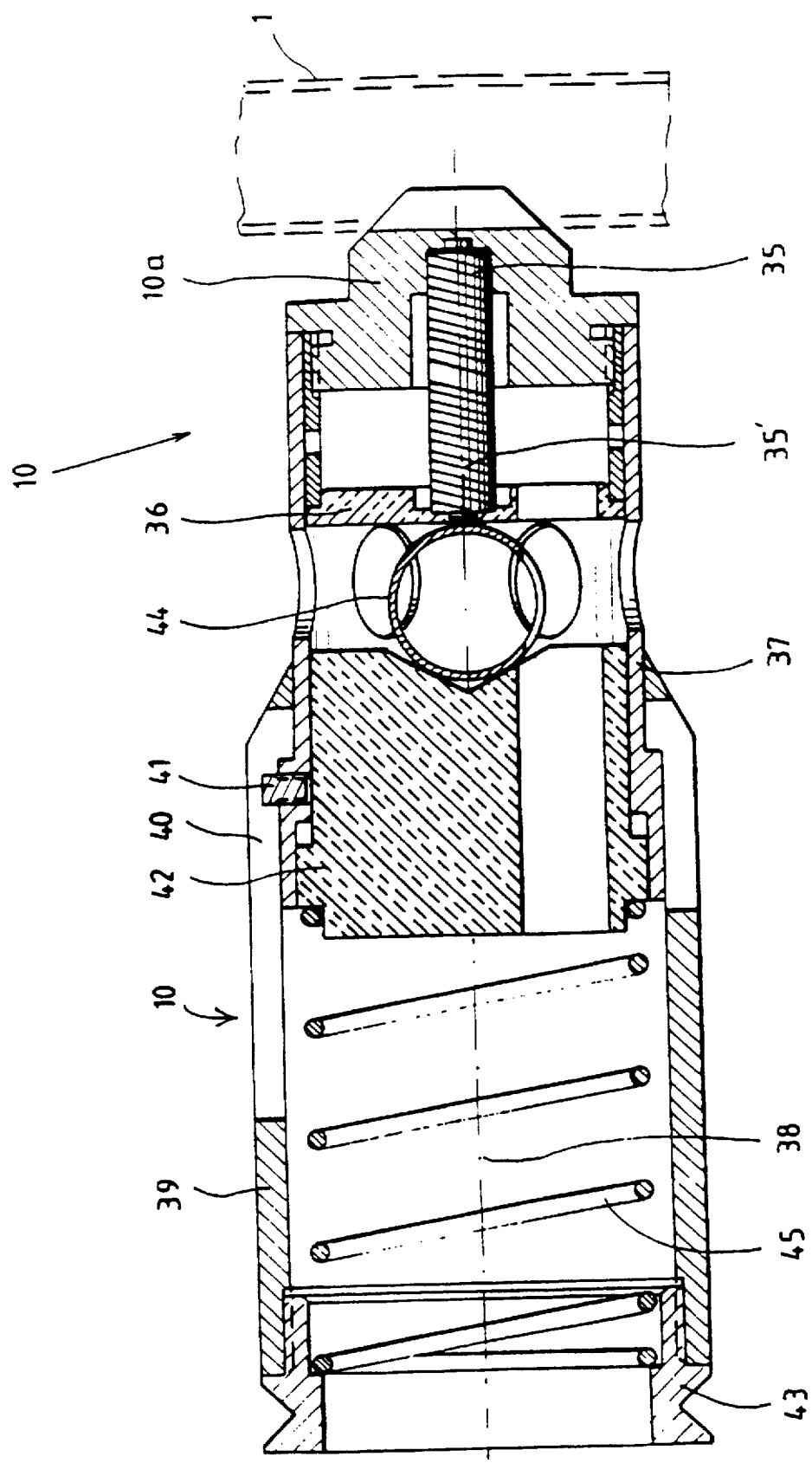
FIG. 6 is an axial sectional view of the eddy-current probe shown in FIGS. 4 and 5.

FIG. 6 shows the probe 10 whose measurement head 10a forming the end part coming into contact with the cladding of the fuel rod 1 has a housing for accommodating an end part of a measurement coil which has a ferrite core and two windings 35 and 35' which are wound onto the core so as to be coaxial and are spaced apart in the horizontal direction. The second end of the coil, on the winding 35' side, is engaged in a cavity in a support 36.

The measurement coil 35, 35', the measurement head 10a and the support 36 are mounted inside a movable support 37 which is mounted for sliding movement in the axial direction 38 of the probe inside a main probe body 39. The movable support 37 and the main body 39 of the probe are of cylindrical shape and have as common axis the axis 38 of the probe. The main probe body 39 includes an axial longitudinal groove 40 in which a guide pin 41 integral with the movable support 37 is engaged. The guide pin 41 is engaged with a certain clearance in the circumferential direction, inside the groove 40. In this way, the movable support 37 can pivot about the axis 38 to a limited extent only. The measurement head 10a and, in particular, the end in the form of a cylindrical cavity thus maintain an orientation with respect to the vertical rods 1 of the bundle of the nuclear fuel assembly which allows engagement of the cavity around a rod in order to perform the measurements, with a certain freedom of rotational movement in order to adapt to the profile of the rod.

Fixed inside the movable rod 37 is a thrust piece 42 which includes a cavity having a V-shaped cross-section directed toward the measurement coil 35, 35'. A standard reference tube 44 consisting of a portion of a fuel rod cladding similar to the fuel rod 1 is inserted between the thruster 42 and the support 36 for that end part of the winding 35' of the coil opposite the measurement head 10a.

An annular stop piece 43 is screwed into the end part of the main body 39 of the probe 10. A helical spring 45 is inserted between the stop piece 43 and the thrust piece 42. The helical spring 45 allows movements of the movable support 37 and of the measurement head 10a of the probe 10 with respect to the main body 39 which is integral with the probe support, both during contacting and during movements of the probe 10 in the vertical direction. The spring 45 exerts a thrust on the movable support 37 and on the measurement head 10a in such a way that the measurement head 10a is in perfect contact, by means of its cylindrical end surface, with the external surface of the cladding of the rod 1 on which the measurements are performed. This arrangement makes it possible to avoid exerting, via the probe, excessive force on the cladding of the rod and via the rod on the springs holding the rod in place in the cells of the grids of the fuel assembly. Any plastic deformation of the springs for holding the rods of the assembly in place during the measurements performed on the peripheral rods is thus avoided.

To this end the carriage for moving the measurement device 8 in the direction Y, driving the probe 10 forward toward the peripheral rods 1 of the fuel assembly includes a front stop in a position such that, in its most forward position, the carriage for movement in direction Y causes the measurement head 10a of the probe 10 to come into contact with the fuel rod 1 and the spring 45 to be compressed such that the force exerted by the measurement head 10a of the probe on the rod 1 is at most 10 N.

Furthermore, should the stop device of the carriage for moving in the direction Y become defective, the spring 45 is provided with a constant such that the force exerted on the measurement head by the fully compressed spring, i.e. when the guide finger 41 has come into abutment against the bottom of the groove in the main body 39, is at most 25 N.

The measurement head 10a in its upper part and in its lower part has, as may be seen in FIGS. 5 and 6, two chamfered contact surfaces inclined at 45° with respect to the axis 38 of the probe. While the probe 10 in contact with a peripheral rod of a fuel assembly is being moved vertically, the inclined parts of the probe allow the probe easily to circumvent the grids of the assembly, the peripheral belt of which projects slightly from the cladding of each peripheral rod of the assembly. The circumvention is achieved by the chamfered surfaces of the measurement head 10a coming into contact with the peripheral belt of the spacer grid, in particular at guide fins of the fuel assembly whose inclination is identical to the inclination of the chamfered parts of the measurement head 10a, and by a rearward movement of the movable support 37 of the probe which is accompanied by compression of the spring 45.

The measurement windings 35 and 35', which are arranged in the axial extension of one another, are supplied with alternating current characteristically during the measurements, and are moved into the vicinity of the external surface of the fuel rod on which the measurements are performed. The variations in the eddy currents flowing in the fuel rod opposite the probe lead to variations in the impedance of the probe, allowing certain characteristic elements inside the clad of the rod to be detected depending on the signal provided by the eddy-current probe.

In particular, it has been possible to identify characteristic signals when the probe is located opposite the internal surface of the bottom end plug or the top end plug and also when the probe is located opposite the bottom part of the spring bearing on the stack of fissile pellets.

The characteristic signal may be obtained, depending on the situation, either on the X output channel or on the Y output channel of the eddy-current apparatus.

Figure 7A:
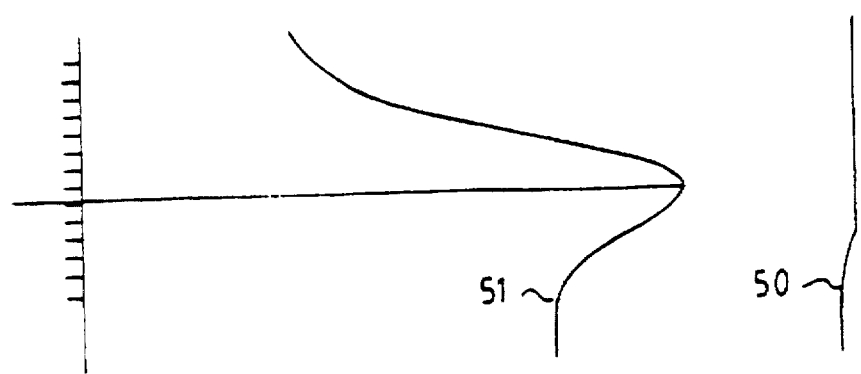
FIGS. 7A, 7B and 7C represent graphical recordings obtained while the measurement method according to the invention is being used.
Figure 7B:
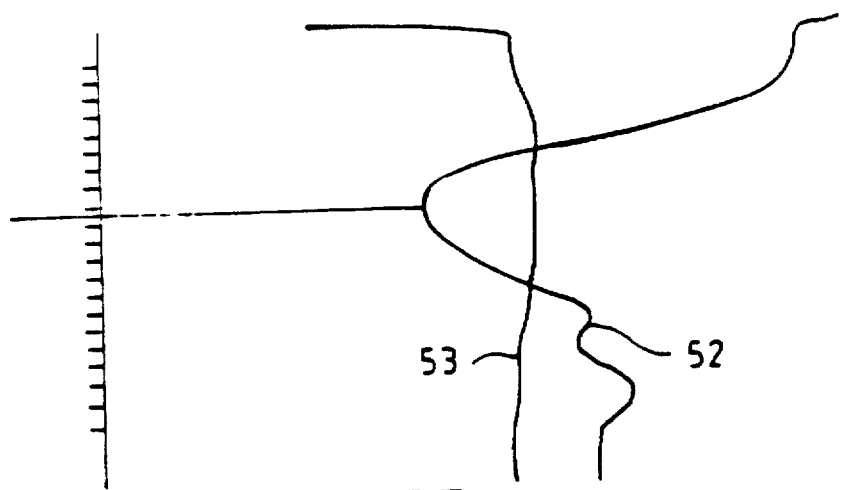
Figure 7C:
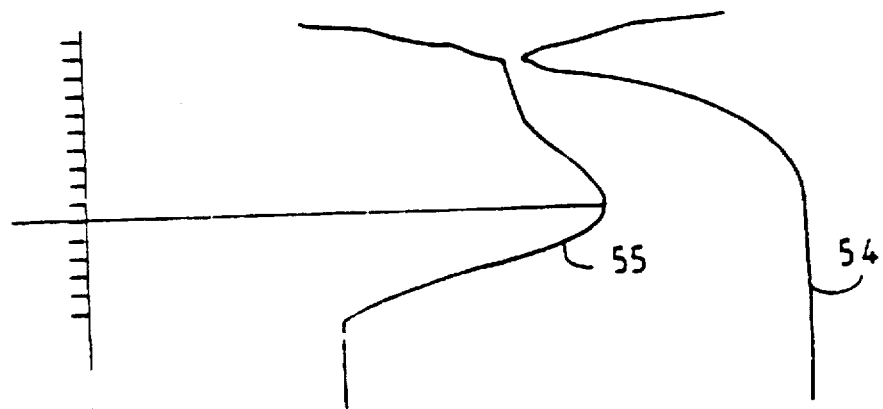

FIGS. 7A, 7B and 7C show the characteristic signals obtained on the X output channel and on the Y output channel of the eddy-current apparatus, with respect to the graduated scale along the vertical direction showing the height of the probe within 0.1 mm.

The signals shown in FIGS. 7A, 7B and 7C are obtained on the screen of the visual display unit 31 of the measurement system.

FIG. 7A shows the signals 50 and 51 coming from the X and Y outputs of the eddy-current apparatus 30 when the probe 10 is located opposite the internal surface 3A of the bottom end plug 3 of a fuel rod 1, as shown in FIG. 1.

The signal 51 of the Y channel of the eddy-current apparatus has a very pronounced maximum value which makes it possible to determine very accurately the height of the internal surface 3a forming the bottom end of the fissile stack 4.

FIG. 7B shows the output signals 52 and 53 on the X and Y channels of the eddy-current apparatus, respectively, when the probe located opposite the bottom end of the spring 7 of the rod 1 coming into contact with the top end of the fissile stack 4. The peak in the signal 52 coming from the X channel of the eddy-current apparatus makes it possible to determine with very great accuracy the position of the bottom end of the spring, i.e. the position of the top end of the fissile stack 4.

Finally, FIG. 7C shows the signals 54 and 55 which are respectively the output signals from the X and Y channels of the eddy-current apparatus when the probe 10 located opposite the internal surface 6a of the top end plug 6 of the fuel rod 1.

The peak in the output signal 55 of the Y channel makes it possible to determine with very great accuracy the position of the internal surface 6a of the upper end plug 6.

When the signals characteristic of the presence, opposite the probe, of the internal surface of the bottom end plug, the bottom end of the spring and the internal surface of the top end plug appear on the screen of the visual display unit, the height of the probe, given by the height coder, is detected and recorded.

Denoting the respective heights of the probe when the internal surface of the bottom plug, the bottom surface of the spring and the internal surface of the top plug by $Z_B$, $Z_S$ and $Z_T$ respectively, it is possible to determine the total length of the rod $L_T$ and the length of the fissile stack $L_{FS}$ from the following formulae:

$$L_T = Z_T - Z_B + 29.4 \text{ and}$$

$$L_{FS} = Z_S - Z_B.$$

This is because the total length in the axial direction of the bottom end plug and the top end plug is known, this length being 29.4 mm. Moreover, the heights $Z_B$, $Z_S$ and $Z_T$ in millimeters have been so determined that the formulae given above make it possible to determine the total length of the rod and the length of the fissile column, in millimeters, with an accuracy of about 0.1 mm.

In order to use the method according to the invention on all the peripheral rods of a fuel assembly stored in the bottom of the spent fuel pond, the handling crane of the spent fuel pond is employed in order to take hold of the fuel assembly and bring it into alignment with the axis of the compartment 12 of the elevator, to the top part of which compartment the carrier for the measurement device is clamped, as shown in FIG. 2.

The fuel assembly is oriented so that one of its peripheral faces is directed perpendicularly to the axis 38 of the probe mounted on the carriage 19 for moving the measurement device 8 vertically. Next, the fuel assembly is held in place in this position by the handling device from which it is suspended.

The probe is placed in a set-back position obtained by rearward movement of the carriage for moving the XY table 16 in the Y direction. By moving the XY table in the X direction, the axis of the probe 10 is placed opposite a first peripheral fuel rod of the assembly 15 arranged at one end of the peripheral face directed towards the measurement probe.

By using the elevator, the probe 10 is approximately positioned opposite the bottom end of the rod closed by the bottom end plug.

By means of a Y movement of the probe in the direction of advance, the measurement head 10a of the probe 10 is brought into contact with the outside surface of the cladding of the rod. The eddy-current probe is powered and the signals produced by the probe during a very low-speed movement in the vertical direction, using the carriage 19 for movement in the Z direction, are detected. The carriage 19 for movement in the direction Z together with its guide and movement means are produced so as to obtain a maximum movement of the probe in direction Z at a speed of about 1 mm/second over a distance of from 100 to 150 mm.

When the characteristic signal, as shown in FIG. 7A, of the presence of the internal surface 3a of the bottom end plug 3 has been detected, the height $Z_B$ given by the height coder is recorded.

The probe is then moved back with respect to the guide tube by movement of the probe in the Y direction in order to move it away from the fuel rod.

The elevator is then used to move the measurement device 8 fixed to the carrier 11 fastened to the compartment 12 vertically until the eddy-current probe reaches a high position which is close to the theoretical high position of the top of the fissile stack 4. Detection of the signal, as shown in FIG. 7B, representative of the bottom part of the spring 7 for holding the fuel pellets in place is then sought by moving the probe vertically at low speed after having brought it back into contact with the fuel rod 1 by a Y movement in the forward direction. Detection of the signal 52 representative of the bottom part of the spring makes it possible to determine the height $Z_S$.

The probe is then placed in the set-back position again and the entire measurement device is moved until it is in the vicinity of the top part of the rod in order to determine the height $Z_T$ of the internal surface 6a of the top end plug 6.

It is therefore possible to determine the total length $L_T$ of the rod or the length of the fissile stack $L_{FS}$ or both these characteristic lengths of the rod by using the calculation formulae mentioned hereinabove.

Of course, all the operations for acquisition of the data relating to the height of the probe and for calculation of the characteristic lengths of the fuel rod may be carried out automatically using the measurement system shown in FIG. 3. The measured characteristic lengths are also stored in a memory with respect to an identification number for the rod of the assembly.

The same probe-movement, signal-detection and height-measurement operations are carried out for each of the peripheral rods of that face of the fuel assembly 15 located opposite the measurement apparatus.

Next, the fuel assembly suspended from the hoist of the handling crane may be rotated through 90° in order to carry out the same operations successively on each of the peripheral rods located on a second face of the fuel assembly.

The method according to the invention makes it possible to obtain, rapidly and extremely accurately, characteristic lengths of the peripheral fuel rods of irradiated fuel assemblies stored in the spent fuel pond of a nuclear reactor.

It is possible to measure characteristic fuel-rod lengths other than the total length of the rod and the length of the fissile stack, by detecting signals characteristic of the presence of the probe opposite a defined region of the rod, located at a precise point along its length.

The measurement device may be moved along the length of the rod, and the probe positioned with respect to the rods on which measurements are performed, using devices other than an XY cross-movement table and a carriage for moving in the vertical direction Z.

Likewise, the measurement device may be moved rapidly along the rods of the assembly by a device other than a fuel assembly elevator.

The eddy-current probe may have a structure other than that which has been described.

In some cases, it is possible to make corrections to the probe height measurements, depending on the position of the rods along the peripheral face of the fuel assembly.

The invention may be applied to length measurements on peripheral nuclear fuel assembly rods of a type other than the nuclear fuel assemblies normally used in pressurized-water nuclear reactors.

What is claimed is:

1. A method for measuring at least one characteristic length on a fuel rod (1, 1a, 1b, 1c) arranged at a periphery of a nuclear fuel assembly, the fuel rod including a tubular cladding (2), a stack (4) of pellets (5) of nuclear fuel material which are stacked in an axial direction of the cladding (2), a bottom end plug at a first end of said cladding and having an internal surface (3a) in contact with a first end of the stack (4) of pellets (5), a top end plug (6) for closing a second end of said cladding (2), and a helical spring (7) inserted between an internal surface (6a) of said top end plug (6) and a second end of the stack (4) of pellets (5) of fuel material, inside the cladding (2), said method comprising the steps of:

(a) moving an eddy-current probe (10) in the axial direction of the cladding (2) of the rod (1);

(b) identifying a first axial position of the eddy-current probe (10) with respect to a marker (20), in which position a signal from the probe (10) is representative of the presence of the internal surface (3a) of the bottom end plug (3) level with the probe (10) and at least one second position in which the signal from the probe (10) is representative of the presence, level with the probe (10), of one of the following elements: the end part of the spring (7), in contact with the second end of the stack (4) of pellets (5), and the internal surface (6a) of the top end plug (6); and (c) calculating the characteristic length from said first position and said second position of the probe (10), these positions being defined with respect to the marker (20).

2. The method according to claim 1, wherein the signal from the probe (10) in said second position is representative of the presence, level with the probe (10), of the internal surface (6a) of the top end plug (6), and including the step of calculating the total length ($L_T$) of the fuel rod (1) from a parameter ($Z_B$) representative of the position in the axial direction of the internal surface of the bottom end plug (3), from a second parameter ($Z_T$) representative of the position in the axial direction of the rod of the internal surface (6a) of the top second end plug (6) and from the sum of the lengths in the axial direction of the bottom end plug (3) and the top end plug (6).

3. The method according to claim 1 wherein, in said second position, the probe (10) is located opposite the bottom part of the spring (7), and including the step of calculating the length ($L_{FS}$) of the fissile stack (4) of the rod (1) from a parameter ($Z_B$) representative of the position (10) of the internal surface (3a) of the bottom end plug (3) and from a second parameter ($Z_S$) representative of the position in the axial direction of the bottom part of the spring (7) in contact with the second end of the fissile stack (4).

4. The method according to claim 1, including placing the nuclear fuel assembly (15) in an arrangement in which the axial direction of the fuel rods is vertical, inside a spent fuel storage pond of a nuclear reactor.

5. The method according to claim 4, including arranging the fuel assembly along the axis of an elevator placed in a vertical direction along a wall of a spent fuel storage pond of a nuclear reactor.

6. The method according to claim 1, including moving the eddy-current probe (10) at a first speed so as to place it in the vicinity of said first or second position with respect to the peripheral fuel rod (1) of the fuel assembly (15), in the axial direction of the fuel rod (1), and then moving said eddy-current probe at a second speed very much less than said first speed in the vicinity of said first or second position.

* * * * *